United States Patent
Jeske et al.

(10) Patent No.: US 7,578,120 B2
(45) Date of Patent: Aug. 25, 2009

(54) DEVICE FOR INJECTING WATER OR WATER VAPOR INTO THE WORKING MEDIUM OF A GAS TURBINE PLANT

(75) Inventors: Hans-Otto Jeske, Wesel (DE); Emil Aschenbruck, Duisburg (DE)

(73) Assignee: Man Turbo AG, Oberhausen (DE)

( * ) Notice: Subject to any disclaimer, the term of this patent is extended or adjusted under 35 U.S.C. 154(b) by 589 days.

(21) Appl. No.: 11/252,051

(22) Filed: Oct. 17, 2005

(65) Prior Publication Data

US 2006/0090447 A1 May 4, 2006

(30) Foreign Application Priority Data

Oct. 28, 2004 (DE) .................. 10 2004 052 483

(51) Int. Cl.
- *F02C 7/00* (2006.01)
- *F02C 9/00* (2006.01)
- *F02C 3/30* (2006.01)

(52) U.S. Cl. .................. 60/39.53; 60/39.3; 60/775
(58) Field of Classification Search ............... 60/39.53, 60/39.3, 775, 39.58, 39.59, 39.55
See application file for complete search history.

(56) References Cited

U.S. PATENT DOCUMENTS

| | | | |
|---|---|---|---|
| 3,224,195 A * | 12/1965 | Walsh | 60/39.55 |
| 3,280,555 A * | 10/1966 | Georges-Francois et al. | 60/794 |
| 4,338,780 A * | 7/1982 | Sakamoto et al. | 60/775 |
| 4,377,067 A | 3/1983 | Sternfeld et al. | |
| 5,697,209 A | 12/1997 | Wettstein | |
| 5,816,041 A | 10/1998 | Greninger | |
| 6,112,511 A | 9/2000 | Myers | |
| 6,536,206 B2 * | 3/2003 | Hook et al. | 60/39.53 |
| 6,595,003 B2 * | 7/2003 | Dalla Betta et al. | 60/777 |

FOREIGN PATENT DOCUMENTS

| | | |
|---|---|---|
| DE | 44 46 543 A1 | 6/1996 |
| DE | 102 05 972 | 10/2003 |
| EP | 1 132 593 B1 | 6/2001 |
| EP | 1 132 593 B1 | 9/2001 |
| JP | 05332164 A | 12/1993 |
| WO | WO 00/11323 | 3/2000 |

OTHER PUBLICATIONS

1981, *Taschenbuch Für den Maschinenbau* [*Mechanical Engineering, paperback edition*], Dubbel, 14th edition, 1981, p. 932.
*Taschenbuch für den Maschinenbau* [*Mechanical Engineering, paperback edition*]/Dubbel, 14th edition, 1981, p. 932).

* cited by examiner

*Primary Examiner*—Michael Cuff
*Assistant Examiner*—Gerald L Sung
(74) *Attorney, Agent, or Firm*—McGlew and Tuttle, P.C.

(57) ABSTRACT

A gas turbine plant having a compressor (1), one or more combustion chambers (2), a high-pressure gas turbine (3) and a power turbine (24) includes a device whereby water or water vapor is injected into the flow of the combustion air compressed by the compressor (1). The injection nozzles (22) are arranged in a bend (20) of an external connection housing (18), which consists of a radial housing part (19) connected to the outlet of the compressor (1) and of an axial housing part (21) connected to the intake of the combustion chamber (2).

5 Claims, 4 Drawing Sheets

DEVICE FOR INJECTING WATER OR WATER VAPOR INTO THE WORKING MEDIUM OF A GAS TURBINE PLANT

CROSS REFERENCE TO RELATED APPLICATIONS

This application claims the benefit of priority under 35 U.S.C. § 119 of German Application 10 2004 052 483.1 filed Oct. 28, 2004, the entire contents of which are incorporated herein by reference.

FIELD OF THE INVENTION

The present invention pertains to a device for injecting water or water vapor into the working medium of a gas turbine plant having a compressor, one or more combustion chambers of a high-pressure gas turbine and a power turbine.

BACKGROUND OF THE INVENTION

Water vapor or water is injected into the combustion chamber of the gas turbine plant for reducing the $NO_x$ emissions in the turbine exhaust gas. The flame temperature is consequently lowered and thus low $NO_x$ emissions are achieved.

Furthermore, the technique of injecting water or water vapor is also utilized to achieve an increase in the performance of the gas turbine. The specific heat capacity of the hot gas is increased by the addition of water or water vapor, such that a greater difference in enthalpy is present in the turbine. The mass flux in the gas turbine is increased by the supply of water or water vapor, as a result of which the performance is again increased with the further addition of fuel. Accompanying the increase in performance is the improvement in the efficiency of the gas turbine.

Injecting water or water vapor directly through the fuel nozzles of the combustion chamber is well known. However, because of the narrow space conditions in the combustion chamber area, the arrangement of injection nozzles for a thorough and uniform mixing of the air with water vapor or water is achieved with difficulty only. Furthermore, there is the risk that critical thermoelectric voltages will be generated by the injected medium hitting the hot walls of the combustion chamber.

A gas turbine plant consisting of a compressor, a combustion chamber and a gas turbine, in which water or water vapor is fed onto the first row of turbine blades in the path of the combustion air behind the combustion chamber for increasing the efficiency, has become known from DE 102 05 972 A1.

A gas turbine plant, in which a heat exchanger is connected downstream of the gas turbine in the path of the exhaust gas for heating the combustion air compressed in the compressor of the gas turbine, has become known from JP 05332164 A. In order to increase the service life of the heat exchanger without compromising the heat utilization of the turbine exhaust gas, water or water vapor is fed into the compressed combustion air before its intake into the heat exchanger.

SUMMARY OF THE INVENTION

The basic object of the present invention is to simplify and design the device for injecting water or water vapor of this class being used for reducing the $NO_x$ emission and increasing the performance in such a way that the thorough mixing of the injection medium with the combustion air is improved.

The object is accomplished in a device according to the present invention for injecting water or water vapor into the working medium of a gas turbine plant having a compressor, one or more combustion chambers of a high-pressure gas turbine and a power turbine. The water or water vapor is injected into the flow of combustion air compressed by the compressor. The injection nozzles are arranged in a bend of a external connection housing. The connection housing comprises a radial housing part connected to the outlet of the compressor and an axial housing part connected to the intake of the combustion chamber.

Gas turbine plants with externally arranged combustion chambers and with external connection housings between the compressor outlet and the combustion chamber intake are known per se (e.g., *Taschenbuch für den Maschinenbau [Mechanical Engineering*, paperback edition]/Dubbel, 14th edition, 1981, page 932). Within the framework of the present invention, this arrangement is used for placing the injection nozzles in the bend of the connection housing. The free accessibility to the connection housing provides very good prerequisites for the optimal arrangement and open design of the injection nozzles. Consequently, the goal of a best possible thorough mixing of water or water vapor with the combustion air can be achieved both from a technical point of view and from the point of view of production costs.

The injection nozzles may be arranged directed against the direction of flow of the combustion air coming radially out of the compressor. The injection nozzles may also be arranged directed into the direction of flow of the combustion air entering the combustion chamber axially. Further, the injection nozzles may be arranged directed laterally to the direction of flow of the combustion air coming radially out of the compressor and axially to the combustion air entering the combustion chamber.

A plurality of exemplary embodiments of the present invention are shown in the drawing and are explained in detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
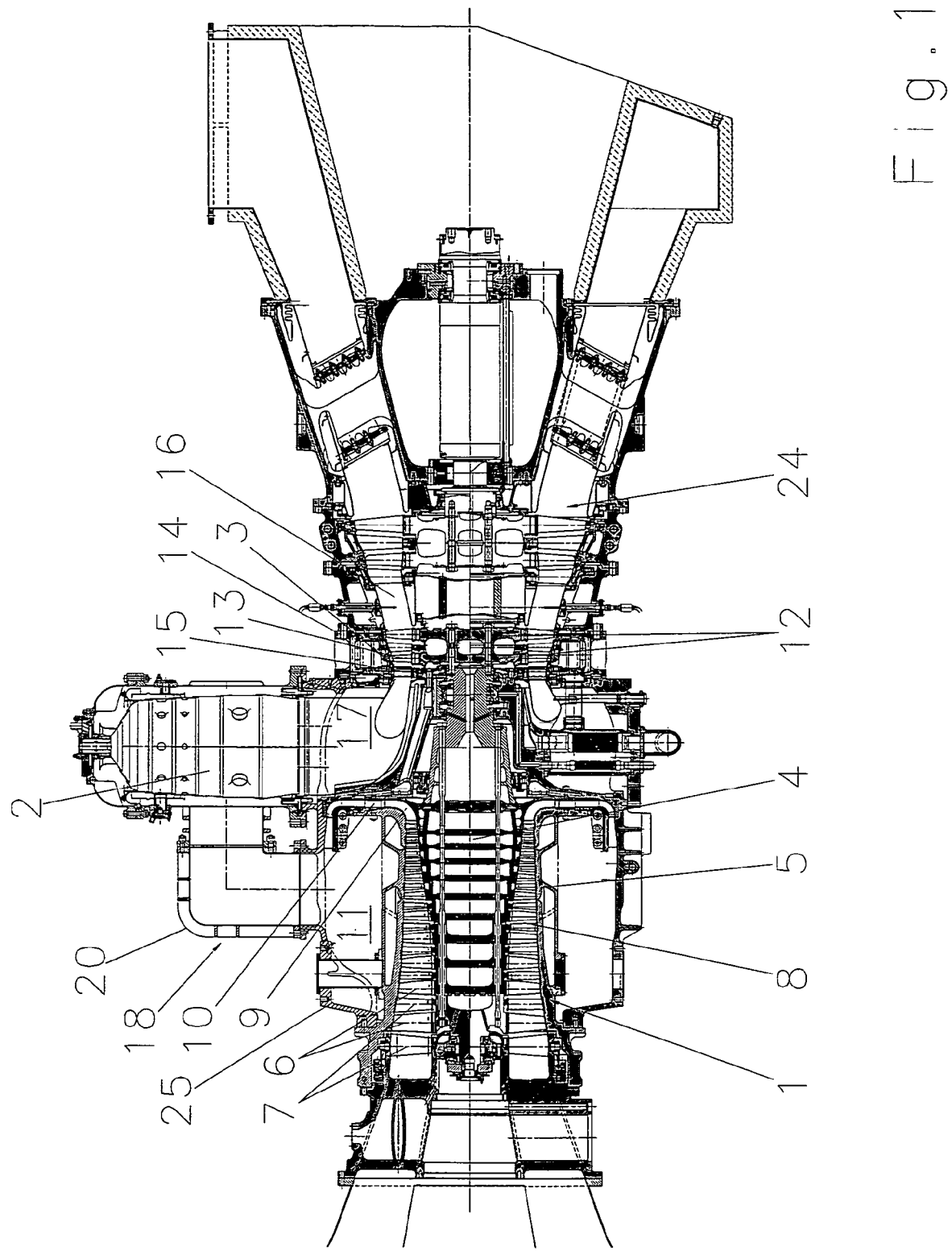
FIG. 1 is a longitudinal sectional view through a gas turbine plant according to the invention.

Referring to the drawings in particular, the gas turbine plant shown comprises a compressor 1, one or more external combustion chambers 2, a high-pressure gas turbine 3 and a secondary power turbine 24.

The compressor 1 of the gas turbine plant consists of a rotor 4 which rotates in a housing 5 and is equipped on its perimeter with a plurality of rows of rotor blades 6. In front of each row of rotor blades 6 is arranged a row of fixed guide blades 7, which are fastened in the housing 5 and, with the rotor blades 6, extend into a ring-shaped flow channel 8 between the rotor 4 and the housing 5. The ring-shaped flow channel 8 passes behind the row of guide blades, which follows the last row of rotor blades 6, into a radial rotor disk 9 with subsequent radial diffuser 10. A deflection with axial flowing into a collecting chamber 11, which represents the outlet of the compressor 1, takes place behind the radial diffuser 10.

The high-pressure gas turbine 3 consists of a rotor 12, which comprises two rotor disks, which are equipped with a plurality of rotor blades 13 each. The rotor 12 of the high-pressure gas turbine 3 is connected directly to the rotor 4 of the compressor 1 and rotates in the housing 14. Each row of rotor blades 13 of the high-pressure gas turbine 3 is superimposed on a row of fixed guide blades 15, which are fastened to the housing 14 and, with the rotor blades 13, extend into a ring-shaped flow channel 16 between the rotor 12 and the housing 14.

An external combustion chamber 2 is arranged above on an external housing 25 of the gas turbine plant. The gas turbine plant may also be equipped with two or more combustion chambers instead of only the combustion chamber 2. The outlet of the combustion chamber 2 is connected via a gas supply tube 17 to the ring-shaped flow channel 16 of the high-pressure gas turbine 3. If two or more combustion chambers 2 are provided, then the gas supply tube 17 unites the hot gas flows of all combustion chambers 2.

An external connection housing 18, which establishes the connection between the compressor 1 and each of the combustion chambers 2 and supplies the combustion chamber or combustion chambers 2 with compressed combustion air, is connected to the collecting chamber 11 of the compressor 1. The connection housing 18 has an angular design and has a housing part or portion 19 running radially to the axis of the gas turbine plant, which passes over a bend 20 into a housing part or portion 21 running axially to the axis of the gas turbine plant. The housing part 21 is connected to the air intake of the combustion chamber or combustion chambers 2.

In the bend 20 of the connection housing 18 there are arranged a plurality of injection nozzles 22, which are connected to borings 23 in the wall of the bend 20. These are conventional nozzles. Water or water vapor is injected by means of the injection nozzles 22 into the compressed combustion air before its entry into the combustion chamber 2.

Figure 2:
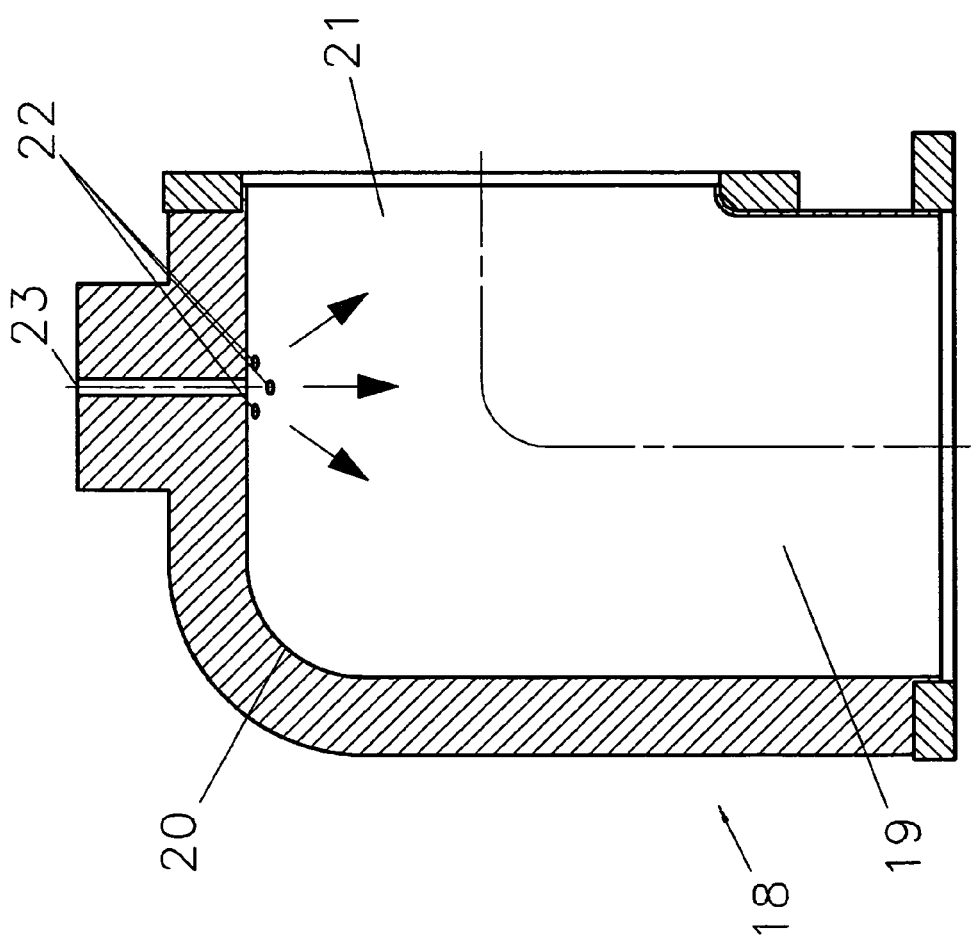
FIG. 2 is a sectional view of the detail Z according to FIG. 1 showing an embodiment according to the invention.

In a first, preferred exemplary embodiment, the injection nozzles 22 are arranged in the head area of the bend 20 and are directed against the direction of flow of the combustion air coming radially out of the compressor 1 (FIG. 2).

Figure 3:
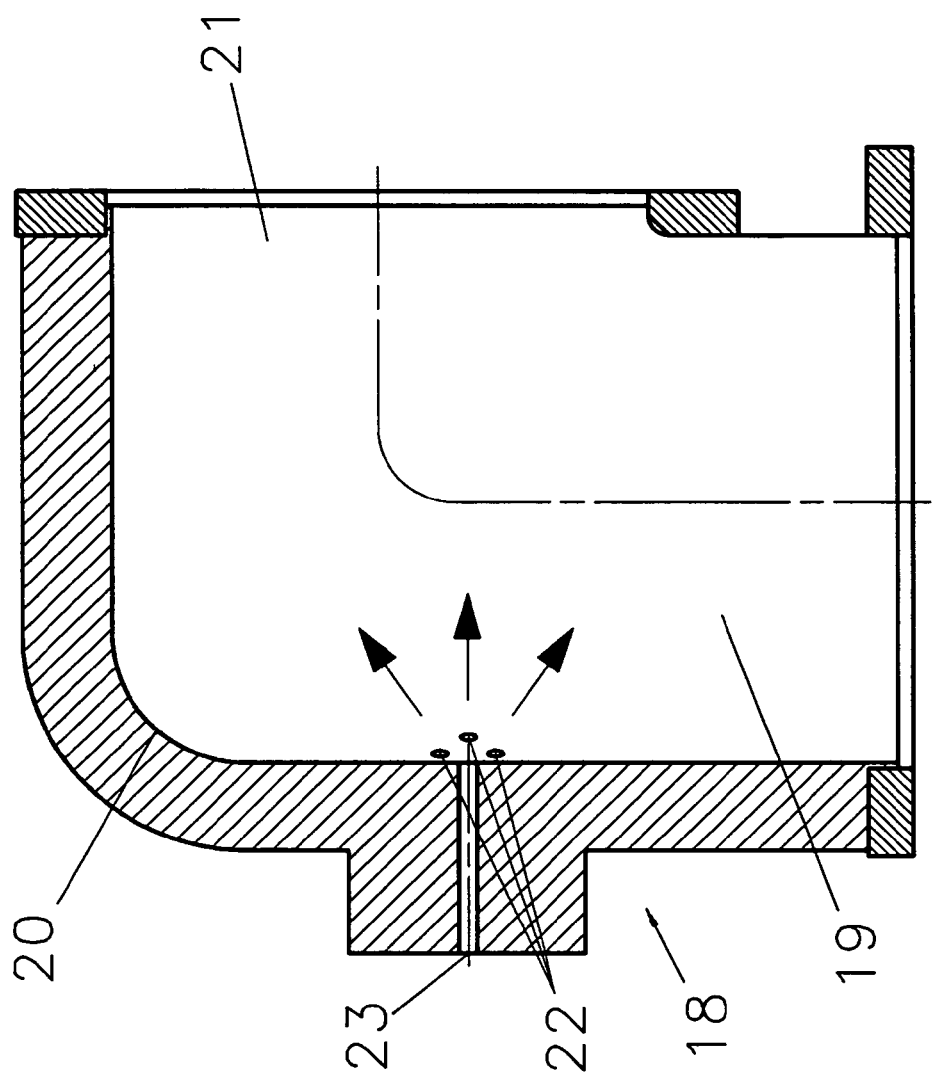
FIG. 3 is a sectional view of the detail Z according to FIG. 1 showing another embodiment according to the invention.

In a second, preferred exemplary embodiment, the injection nozzles 22 are arranged in the front wall of the bend 20 and are directed axially to the combustion air entering the combustion chamber 2 (FIG. 3).

Figure 4:
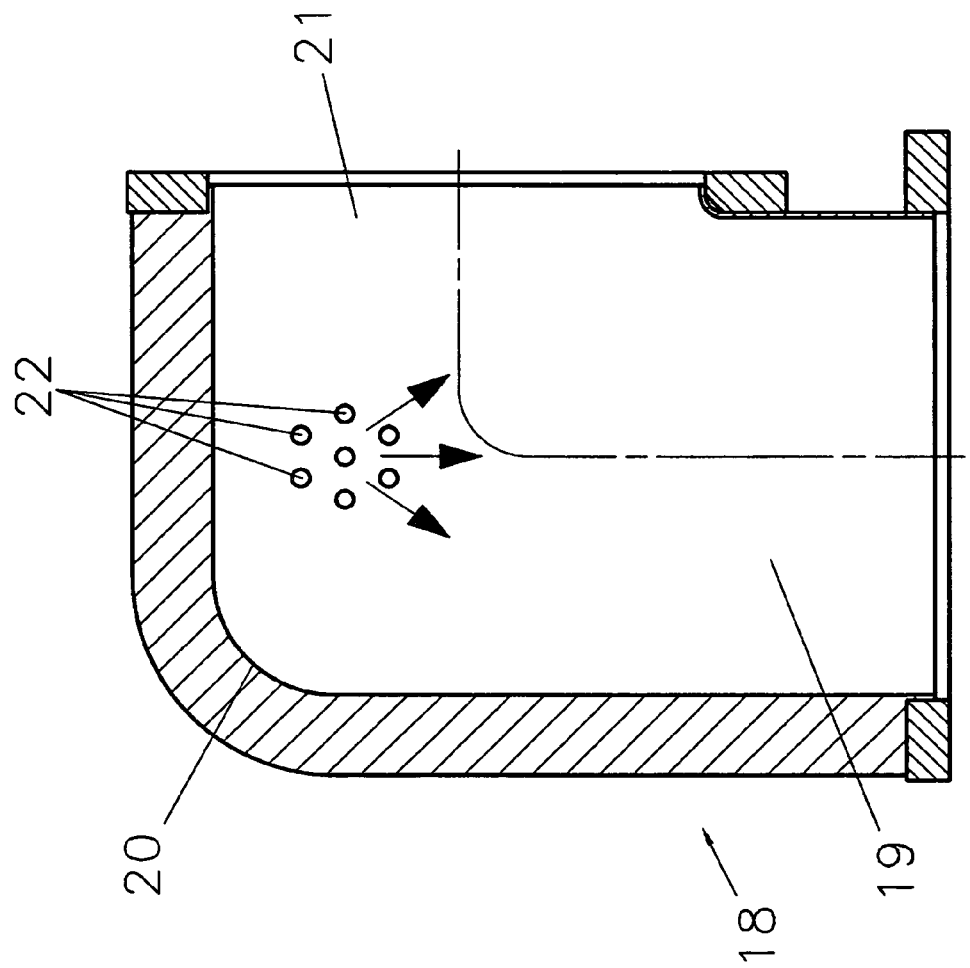
FIG. 4 is a sectional view of the detail Z according to FIG. 1 showing still another embodiment according to the invention.

Furthermore, in a third, preferred exemplary embodiment, the injection nozzles 22 are directed in the side walls of the bend 20 laterally to the direction of flow of the combustion air coming radially out of the compressor 1 and axially to the combustion air entering the combustion chamber 2 (FIG. 4).

While specific embodiments of the invention have been shown and described in detail to illustrate the application of the principles of the invention, it will be understood that the invention may be embodied otherwise without departing from such principles.

What is claimed is:

1. A gas turbine plant comprising:
   a compressor having a compressor outlet;
   a high-pressure gas turbine with a combustion chamber and power turbine, said combustion chamber having a combustion chamber intake;
   a device for injecting water or water vapor into a working medium, said device comprising an external connection housing with a radial housing portion, an axial housing portion and a plurality of injection nozzles, said external connection housing having a bent portion located between said radial housing portion and said axial housing portion, said radial housing portion being connected to said compressor outlet, said axial housing portion being connected to said combustion chamber intake, said bent portion having an inner bent portion surface for changing a direction of flow from a radial flow in said radial housing portion to an axial flow in said axial housing portion, said inner bent portion surface defining a space having a contour that is substantially similar to a contour of said bent portion, said injection nozzles being arranged along said inner bent portion surface such that each of said injection nozzles has an opening facing in a direction of said space, wherein water or water vapor is injected into a flow of combustion air compressed by said compressor via said device.

2. A gas turbine plant in accordance with claim 1, wherein the injection nozzles are arranged in a head area of said bend and said nozzles are directed against the direction of flow of the combustion air coming radially out of the compressor.

3. A gas turbine plant in accordance with claim 1, wherein the injection nozzles are arranged in a front wall of said bend and said nozzles are directed into the direction of flow of the combustion air entering the combustion chamber axially.

4. A gas turbine plant in accordance with claim 1, wherein the injection nozzles are arranged in a side wall of said bend and said nozzles are directed laterally to the direction of flow of the combustion air coming radially out of the compressor and axially to the combustion air entering the combustion chamber.

5. A gas turbine plant in accordance with claim 1, wherein said injection nozzles are located adjacent to said bent portion inner surface.

\* \* \* \* \*